(12) United States Patent
Ray et al.

(10) Patent No.: US 8,521,121 B2
(45) Date of Patent: Aug. 27, 2013

(54) SYSTEM AND METHOD FOR PERFORMING AN ABBREVIATED POWER-UP SEQUENCE ON A WIRELESS COMMUNICATIONS DEVICE

(75) Inventors: Amar Nath Ray, Shawnee, KS (US); Carl M. Coppage, Kansas City, MO (US); Lynn T. Greene, Olathe, KS (US); Robert J. Morrill, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 762 days.

(21) Appl. No.: 12/257,717

(22) Filed: Oct. 24, 2008

(65) Prior Publication Data

US 2010/0004035 A1 Jan. 7, 2010

Related U.S. Application Data

(60) Provisional application No. 61/078,123, filed on Jul. 3, 2008.

(51) Int. Cl.
*H04M 11/04* (2006.01)

(52) U.S. Cl.
USPC ........................ 455/404.1; 455/574

(58) Field of Classification Search
None
See application file for complete search history.

(56) References Cited

U.S. PATENT DOCUMENTS

| | | |
|---|---|---|
| 5,339,351 A | 8/1994 | Hoskinson et al. |
| 5,379,337 A | 1/1995 | Castillo et al. |
| 5,497,149 A | 3/1996 | Fast |
| 5,555,286 A | 9/1996 | Tendler |
| 5,646,987 A | 7/1997 | Gerber et al. |
| 5,710,803 A | 1/1998 | Kowal et al. |
| 5,936,622 A | 8/1999 | Halverson et al. |
| 5,941,930 A | 8/1999 | Morimoto et al. |
| 6,240,285 B1 | 5/2001 | Blum et al. |
| 6,317,049 B1 | 11/2001 | Toubia et al. |
| 6,366,772 B1 | 4/2002 | Arnson |
| 6,377,169 B1 | 4/2002 | Yanagisawa |
| 6,405,033 B1 | 6/2002 | Kennedy et al. |
| 6,415,018 B1 | 7/2002 | Antonucci et al. |
| 6,424,908 B2 | 7/2002 | Urban et al. |
| 6,456,695 B2 | 9/2002 | Lee |
| 6,480,578 B1 | 11/2002 | Allport |
| 6,526,125 B1 | 2/2003 | Lindsay et al. |
| 6,631,184 B1 | 10/2003 | Weiner |
| 6,636,732 B1 | 10/2003 | Boling et al. |
| 6,690,932 B1 | 2/2004 | Barnier et al. |
| 7,026,925 B2 | 4/2006 | Roche et al. |

(Continued)

OTHER PUBLICATIONS

Dale N. Hatfield, "A Report On Technical and Operational Issues Impacting the Provision of Wireless Enhanced 911 Services," Federal Communications Commission, printed from the World Wide Web on May 8, 2006 (54 pages).

(Continued)

*Primary Examiner* — German Viana Di Prisco
(74) *Attorney, Agent, or Firm* — Swanson & Bratschun, L.L.C.

(57) ABSTRACT

A system and method for powering-up a wireless communications device may include (i) powering-up the wireless communications device using a standard power-up sequence in response to a request for a standard power-up sequence by a user, and (ii) powering-up the wireless communications device using an abbreviated power-up sequence in response to a request for an emergency message to be communicated by the user.

16 Claims, 10 Drawing Sheets

(56) References Cited

U.S. PATENT DOCUMENTS

| | | | |
|---|---|---|---|
| 7,079,627 B2 | 7/2006 | Crago et al. | |
| 7,095,733 B1 | 8/2006 | Yarlagadda et al. | |
| 7,231,218 B2 | 6/2007 | Diacakis et al. | |
| 7,269,413 B2 | 9/2007 | Kraft | |
| 7,391,784 B1 | 6/2008 | Renkel | |
| 7,418,087 B2 | 8/2008 | Luneau et al. | |
| 7,444,238 B1 | 10/2008 | Opitz | |
| 7,496,189 B2 | 2/2009 | Clarisse et al. | |
| 7,679,505 B1 | 3/2010 | Vallaire | |
| 7,706,356 B1 | 4/2010 | Olshansky et al. | |
| 7,734,019 B1 | 6/2010 | Terpstra | |
| 8,364,117 B2 | 1/2013 | Hawkins | |
| 8,428,548 B2 | 4/2013 | Ray et al. | |
| 2001/0003843 A1 | 6/2001 | Scepanovic et al. | |
| 2001/0004588 A1 | 6/2001 | Hong | |
| 2001/0012379 A1 | 8/2001 | Amemiya et al. | |
| 2002/0016189 A1 | 2/2002 | Sheynblat et al. | |
| 2002/0068584 A1 | 6/2002 | Gage et al. | |
| 2002/0136363 A1 | 9/2002 | Stumer et al. | |
| 2003/0063714 A1 | 4/2003 | Stumer et al. | |
| 2003/0109245 A1 | 6/2003 | McCalmont et al. | |
| 2003/0122779 A1 | 7/2003 | Martin et al. | |
| 2003/0133450 A1 | 7/2003 | Baum | |
| 2003/0162554 A1 | 8/2003 | Kong | |
| 2004/0029610 A1 | 2/2004 | Ihira et al. | |
| 2004/0056770 A1 | 3/2004 | Metcalf | |
| 2004/0063439 A1 | 4/2004 | Glazko et al. | |
| 2004/0072583 A1 | 4/2004 | Weng | |
| 2004/0113836 A1* | 6/2004 | Rickerson, Jr. | 342/357.07 |
| 2004/0157564 A1 | 8/2004 | Murakami et al. | |
| 2004/0176123 A1 | 9/2004 | Chin et al. | |
| 2004/0185871 A1 | 9/2004 | Somani et al. | |
| 2004/0198329 A1 | 10/2004 | Vasa | |
| 2004/1025821 | 12/2004 | Reid, Laura | |
| 2005/0003797 A1 | 1/2005 | Baldwin | |
| 2005/0048947 A1 | 3/2005 | Holland et al. | |
| 2005/0070315 A1 | 3/2005 | Rai et al. | |
| 2005/0085257 A1 | 4/2005 | Laird et al. | |
| 2005/0097380 A1 | 5/2005 | Kim | |
| 2005/0101287 A1 | 5/2005 | Jin et al. | |
| 2005/0111630 A1 | 5/2005 | Potorny et al. | |
| 2005/0169248 A1 | 8/2005 | Truesdale et al. | |
| 2005/0197096 A1* | 9/2005 | Yang et al. | 455/404.1 |
| 2005/0201358 A1 | 9/2005 | Nelson et al. | |
| 2005/0209781 A1 | 9/2005 | Anderson | |
| 2005/0239477 A1 | 10/2005 | Kim et al. | |
| 2005/0265326 A1 | 12/2005 | Laliberte | |
| 2005/0277405 A1 | 12/2005 | Noguchi | |
| 2006/0009243 A1 | 1/2006 | Dahan et al. | |
| 2006/0052134 A1 | 3/2006 | Sato | |
| 2006/0056620 A1 | 3/2006 | Shingal et al. | |
| 2006/0133582 A1 | 6/2006 | McCulloch | |
| 2006/0145841 A1 | 7/2006 | Daurensan et al. | |
| 2006/0152373 A1 | 7/2006 | King | |
| 2006/0166685 A1 | 7/2006 | Adkins | |
| 2006/0217105 A1 | 9/2006 | Kumar P S et al. | |
| 2006/0217136 A1 | 9/2006 | Bantukul et al. | |
| 2006/0219542 A1 | 10/2006 | Savir | |
| 2006/0222151 A1 | 10/2006 | Goldman et al. | |
| 2006/0227122 A1 | 10/2006 | Proctor | |
| 2006/0229100 A1 | 10/2006 | Born | |
| 2006/0238384 A1 | 10/2006 | Hess et al. | |
| 2006/0276168 A1 | 12/2006 | Fuller et al. | |
| 2006/0293024 A1 | 12/2006 | Benco et al. | |
| 2007/0001902 A1 | 1/2007 | Kuo et al. | |
| 2007/0003024 A1 | 1/2007 | Olivier et al. | |
| 2007/0082652 A1 | 4/2007 | Hartigan et al. | |
| 2007/0201391 A1 | 8/2007 | Belmonte et al. | |
| 2007/0201645 A1 | 8/2007 | Gass et al. | |
| 2007/0273519 A1 | 11/2007 | Ichikawa et al. | |
| 2007/0280428 A1 | 12/2007 | McClelland | |
| 2007/0287473 A1 | 12/2007 | Dupray | |
| 2008/0001734 A1 | 1/2008 | Stilp et al. | |
| 2008/0013696 A1 | 1/2008 | Motley et al. | |
| 2008/0057944 A1 | 3/2008 | Miriyala et al. | |
| 2008/0057987 A1 | 3/2008 | Landschaft et al. | |
| 2008/0070553 A1 | 3/2008 | Yamakawa et al. | |
| 2008/0122929 A1 | 5/2008 | Chukwu | |
| 2008/0220715 A1 | 9/2008 | Sinha et al. | |
| 2008/0227427 A1* | 9/2008 | Kadavallur et al. | 455/403 |
| 2008/0254810 A1 | 10/2008 | Fok et al. | |
| 2008/0273670 A1 | 11/2008 | Dickinson | |
| 2008/0275950 A1 | 11/2008 | Jordan | |
| 2008/0287748 A1* | 11/2008 | Sapounas et al. | 600/300 |
| 2008/0310850 A1 | 12/2008 | Pederson et al. | |
| 2009/0047924 A1 | 2/2009 | Ray et al. | |
| 2009/0064039 A1 | 3/2009 | Lee et al. | |
| 2009/0121930 A1* | 5/2009 | Bennett et al. | 342/357.07 |
| 2009/0131072 A1 | 5/2009 | Razdan et al. | |
| 2009/0144157 A1 | 6/2009 | Saracino et al. | |
| 2009/0149153 A1* | 6/2009 | Lee | 455/404.1 |
| 2009/0186596 A1 | 7/2009 | Kaltsukis | |
| 2009/0197567 A1 | 8/2009 | Ogram | |
| 2009/0215428 A1 | 8/2009 | Noldus et al. | |
| 2009/0227225 A1 | 9/2009 | Mitchell et al. | |
| 2009/0233573 A1* | 9/2009 | Gray | 455/404.2 |
| 2009/0310602 A1 | 12/2009 | Olshansky et al. | |
| 2010/0098062 A1 | 4/2010 | Croak et al. | |
| 2010/0291894 A1 | 11/2010 | Pipes | |

OTHER PUBLICATIONS

Ansi, "TIA Standard Telecommunications Telephone Terminal Equipment Caller Identity and Visual Message Waiting Indicator Equipment Performance Requirements," TIA-777-A, Revision of TIA/EIA-777, May 1, 2003 (77 pages).

Micro Engineering Labs, Inc., "Caller ID", Retrieved from the Internet at URL: <http://www.melabs.com/resources/callerid.htm> on Apr. 24, 2006; Copyright 2006 by microEngineering Labs, Inc (as of date of retrieval, article last updated Apr. 16, 2006) (3 pages).

Dave Ryan & Asher Hazanchuk, "On-Hook & Off-Hook Caller ID Using DSP," Circuit Cellular INK # 83, Jun. 1997 (12 pages).

Ittiam Systems, "Caller Identification (CLI or Caller ID)," Retrieved from the Internet on Apr. 24, 2006 at URL <http://www.ittiam.com/pages/products/cid.htm, downloaded from the World Wide Web on Apr. 24, 2006 (2 pages).

"AT & T Wireless Unleashes the First and Only Wireless Messaging Device", PhysOrg.com, Sep. 30, 2004; available online at URL: <http://www.physorg.com/news1392.html> (12 pages).

Non-Final Office Action date mailed Aug. 3, 2010 for U.S. Appl. No. 11/891,784.

Response filed Nov. 2, 2010 for U.S. Appl. No. 11/891,784.

Non-Final Rejection mailed Jan. 19, 2011 for U.S. Appl. No. 11/430,232.

Non-Final Rejection mailed Mar. 17, 2011 for U.S. Appl. No. 11/640,714.

RCE filed on Apr. 4, 2011 for U.S. Appl. No. 11/891,784.

Final Rejection mailed Jan. 3, 2011 for U.S. Appl. No. 11/891,784.

Non-Final Rejection mailed Mar. 4, 2011 for U.S. Appl. No. 12/257,424.

"NENA Recommended Generic Standards for E9-1-1 PSAP Equipment" NENA Technical Reference. NENA-04-001 Issue 2, Mar. 2001.

Non-Final Rejection mailed Mar. 28, 2011 for U.S. Appl. No. 12/272,238.

Non-Final Rejection mailed Apr. 1, 2011 for U.S. Appl. No. 12/257,655.

Non-Final Rejection mailed Mar. 3, 2011 for U.S. Appl. No. 12/257,416.

Non-Final Rejection mailed Mar. 17, 2011 for U.S. Appl. No. 12/257,640.

U.S. Appl. No. 12/070,775; Final Rejection dated May 14, 2012; 27 pages.

U.S. Appl. No. 12/257,416; Final Rejection dated Jun. 13, 2012; 38 pages.

U.S. Appl. No. 12/257,640; Final Rejection dated May 2, 2012; 18 pages.

U.S. Appl. No. 12/257,655; Non-Final Rejection dated Jul. 17, 2012; 26 pages.

U.S. Appl. No. 12/257,674; Non-Final Rejection dated Jul. 20, 2012; 21 pages.
U.S. Appl. No. 12/257,836; Final Rejection dated May 14, 2012; 26 pages.
U.S. Appl. No. 12/257,674; Notice of Allowance dated Jan. 25, 2012; 7 pages.
U.S. Appl. No. 12/257,874; Final Rejection dated Oct. 3, 2011; 15 pages.
U.S. Appl. No. 12/257,674 Non-Final Rejection dated Apr. 28, 2011; 14 pages.
U.S. Appl. No. 12/257,725; Final Rejection dated Jan. 17, 2012; 17 pages.
U.S. Appl. No. 12/257,725; Non-Final Rejection dated Jul. 19, 2011; 26 pages.
U.S. Appl. No. 12/257,640; Non-Final Rejection dated Jan. 4, 2012; 19 pages.
U.S. Appl. No. 12/257,640; Final Rejection dated Aug. 17, 2011; 17 pages.
U.S. Appl. No. 12/257,655; Final Rejection dated Sep. 16, 2011; 22 pages.
U.S. Appl. No. 12/257,655; Amendment and Request for Continued Examination dated Dec. 16, 2011; 18 pages.
U.S. Appl. No. 12/070,775; Non-Final Rejection dated Jul. 25, 2011; 33 pages.
U.S. Appl. No. 12/257,836 Non-Final Rejection dated Nov. 29, 2011; 13 pages.
U.S. Appl. No. 12/257,836; Non-Final Rejection dated Jun. 8, 2011; 15 pages.
U.S. Appl. No. 12/257,687; Non-Final Rejection dated Apr. 9, 2012; 16 pages.
U.S. Appl. No. 12/257,637; Non-Final Rejection dated May 10, 2011; 14 pages.
U.S. Appl. No. 12/257,637; Final Rejection dated Sep. 29, 2011; 12 pages.
U.S. Appl. No. 12/257,736; Non-Final Rejection dated Apr. 28, 2011; 15 pages.
U.S. Appl. No. 12/257,736; Final Rejection dated Nov. 23, 2011; 18 paces.
U.S. Appl. No. 12/257,736; Amendment and Request for Continued Examination dated Feb. 22, 2012; 12 pages.
U.S. Appl. No. 12/257,416; Final Rejection dated Jul. 14, 2011; 17 pages.
U.S. Appl. No. 12/257,416; Non-Final Rejection dated Feb. 3, 2012: 24 pages.
U.S. Appl. No. 12/070,775; Notice of Allowance dated Sep. 12, 2012; 24 pages.
U.S. Appl. No. 12/257,674; Final Rejection dated Nov. 5, 2012; 17 pages.
U.S. Appl. No. 12/257,687; Final Rejection dated Aug. 31, 2012; 19 pages.
U.S. Appl. No. 12/257,836; Non-Final Rejection dated Sep. 12, 2012; 25 pages.
U.S. Appl. No. 12/077,775; Issue Notification dated Jan. 9, 2013; 1 page.
U.S. Appl. No. 12/257,640; Non-Final Rejection dated Dec. 5, 2012; 23 pages.
U.S. Appl. No. 12/257,655; Final Rejection dated Jan. 2, 2013; 18 pages.
U.S. Appl. No. 12/257,687; Notice of Allowance dated Feb. 20, 2013; 20 pages.
U.S. Appl. No. 12/257,687; Notice of Panel Decision on Pre-Appeal Brief Review dated Dec. 14, 2012; 2 pages.
U.S. Appl. No. 12/257,725; Notice of Allowance dated Dec. 24, 2012; 24 pages.
U.S. Appl. No. 12/257,640; Final Rejection dated Apr. 15, 2013; 21 pages.
U.S. Appl. No. 12/257,655; Notice of Allowance dated Apr. 16, 2013; 15 pages.
U.S. Appl. No. 12/257,674; Notice of Allowance dated Apr. 3, 2013; 15 pages.
U.S. Appl. No. 12/257,725; Issue Notification dated Apr. 3, 2013; 1 page.
U.S. Appl. No. 12/257,836; Notice of Allowance dated Apr. 12, 2013; 31 pages.
U.S. Appl. No. 13/712,669; Non-Final Rejection dated Mar. 27, 2013; 34 pages.

* cited by examiner

SYSTEM AND METHOD FOR PERFORMING AN ABBREVIATED POWER-UP SEQUENCE ON A WIRELESS COMMUNICATIONS DEVICE

CROSS REFERENCE TO RELATED APPLICATIONS

This Application claims priority to Provisional Patent Application Ser. No. 61/078,123 filed on Jul. 3, 2008; the entire teachings of which are incorporated herein by reference.

BACKGROUND OF THE INVENTION

Telecommunications devices have advanced in a wide variety of ways. As telecommunications networks have improved and expanded functionality, telecommunications devices have followed. For example, wireless devices were developed to enable users to communicate text messages using short message service (SMS), instance messages (IM), and e-mails. Other technological functionality has also been developed for wireless communications devices.

Emergency situations can arise in a variety of ways at unpredictable times. Emergencies may come in the form of weather, crime, illness, natural disasters, man-made disasters, car accidents, and so forth. In an emergency situation, public safety answering points (PSAPs) have been established throughout the United States to answer emergency calls placed to "911." Emergency operators at the PSAPs have been trained to answer emergency calls and provide emergency response by the most suitable emergency response team (e.g., firemen, police, ambulance, etc.) that the emergency situation warrants. Emergency calls, however, are not always possible depending upon the situation. Poor wireless network coverage, need to remain silent so as to avoid being discovered, being in a noisy environment, and having a low battery are a limited set of illustrative reasons as to why emergency voice calls are not always possible.

SUMMARY

To overcome the problems of requesting emergency personnel support in situations where an emergency voice call is not possible or desirable, the principles of the present invention provide for emergency messaging to be provided to users of mobile devices and wireless communications devices. To simplify and expedite emergency messaging for users of a wireless communications devices, an emergency message button may be available on the wireless communications device so that, in response to selection of the emergency message button, an emergency message is generated and sent to a public safety answering point over a communications network. The emergency message button may be a hardbutton or soft-button. If the wireless communications device is powered off when a user activates the emergency message button, an abbreviated emergency power-up sequence may be performed, thereby expediting powering up the wireless communications device and limiting power usage in case the wireless communications device has limited battery power available.

One embodiment of a wireless communications device may include electronics components, a power-on button, an emergency message button, and a standard power-up sequence module. In response to a user activating a power-on button while the wireless communications device is in a power-off mode, the standard power-up sequence module causes the wireless communications device to perform a standard power-up sequence to turn on the electronics components. The wireless communications device may further include an abbreviated power-up sequence module that, in response to the user activating an emergency message button while the wireless communications device is in a power-off mode, causes the wireless communications device to perform an abbreviated power-up sequence to turn on at least a portion of the electronics components.

One embodiment of a method for powering-up a wireless communications device may include (i) powering-up the wireless communications device using a standard power-up sequence in response to a request for a standard power-up sequence by a user, and (ii) powering-up the wireless communications device using an abbreviated power-up sequence in response to a request for an emergency message to be communicated by the user.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
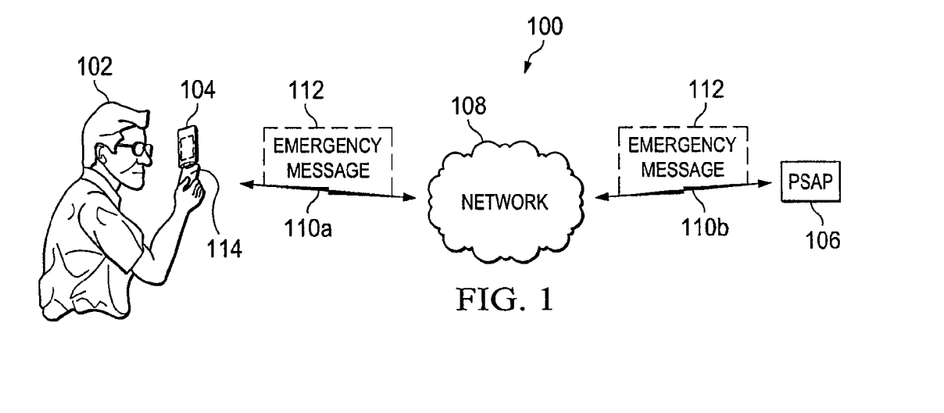
FIG. 1 is an illustrative network environment configured to enable a user to communicate emergency messages to a public safety answering point.

With regard to FIG. 1, a user 102 of a wireless communications device 104 may have a need for communicating with a public safety answering point (PSAP) 106 in an emergency situation. The wireless communications device 104 may be a mobile telephone, personal digital assistant (PDA), wireless electronic game, multi-mode telephone, or other electronic devices capable of communicating emergency data messages (EDMs) to public safety answering points (PSAPs). The wireless communications device 104 may communicate with the PSAP 106 over a communications network 108. The communications network 108 may include one or more communications networks, including mobile communications networks, the Internet, public switched telephone network (PSTN), or other communications network over which the wireless communications device 104 may communicate with the PSAP 106. The wireless communications device 104 may communicate over a wireless communications path 110a with the network 108 and the PSAP 106 may communicate with the network 108 over a communications path 110b, which may be wireless or wired.

In the event of an emergency, the user 102 may utilize the wireless communications device 104 to communicate an emergency message 112 over the network 108 to the PSAP 106. The emergency message 112 traditionally has been a telephone call, but in accordance with the principles of the present invention, the emergency message 112 that may be initiated by the user 102 selecting an emergency message button 114 on the wireless communications device 104, as further described herein.

Figure 2A:
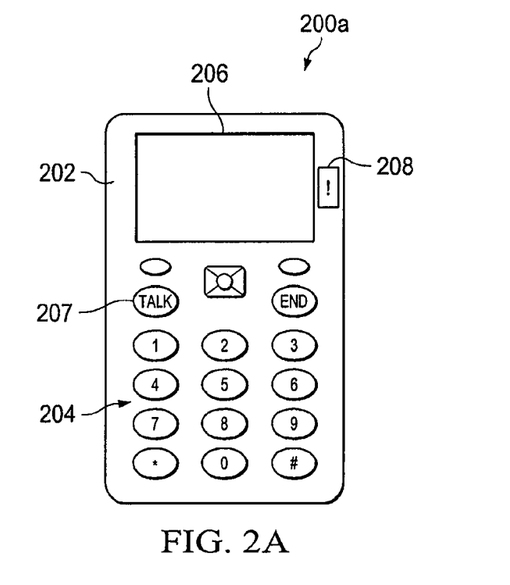
FIGS. 2A-2D are illustrations of illustrative wireless communications devices configured with emergency message buttons for initiating and communicating an emergency message to a public safety answering point.

With regard to FIG. 2A, a wireless communications device 200a includes a housing 202 and user interface 204. The user interface is shown as a keypad, but as understood in the art, the user interface may alternatively be a touch screen or combination thereof. The wireless communications device 200a further includes an electronic display 206 on which information, such as telephone numbers being called or received, are displayed. In addition, an emergency message button 208 may be disposed on the housing in a convenient place for a user to activate an emergency message. In being disposed on the housing, the emergency message button 208 actually passes through or is mounted to the housing 202 and is positioned in a location at which the user may access the emergency message button 208 without having to open any portion of the housing 202. In an alternative embodiment, the emergency message button 208 may be covered by a portion of the housing or other structure (e.g., repositionable flap or cover (not shown)) that can be removed or displaced to enable a user to access the emergency message button 208. As shown, the emergency message button 208 is a hard-button or key that operates in the same or similar manner as buttons or keys of the user interface 204. For example, the emergency message button 208 may be depressible for a user to initiate an emergency message. Alternatively, the emergency message button 208 may be an electronic touch sensor that identifies that a user has contacted the emergency message button 208.

In one embodiment, rather than a user simply having to activate the emergency message button 208 to initiate an emergency message, the wireless communications device 200a may be configured to have the user activate the emergency message button 208 and talk button 207, or any other button, substantially simultaneously to initiate the emergency message. By having the user press both buttons 208 and 207, the ability for the user to inadvertently send an emergency text message to a PSAP is minimal. In an alternative embodiment, both buttons can be activated at different times, such as pressing the emergency message button 208 first and then the talk button 207 to confirm desire to send the emergency message.

One or more illumination devices 209a-209n (collectively 209) may be positioned on the wireless communications device 200a. In one embodiment, one or more of the illumination devices 209 are LEDs. Another illumination device is the electronic display 206. One of the illumination devices 209a may be positioned to illuminate the emergency message button in response to an emergency message being communicated. Other illumination devices 209 may be illuminated, strobed or otherwise used to indicate successfully communicating an emergency message.

Figure 2B:
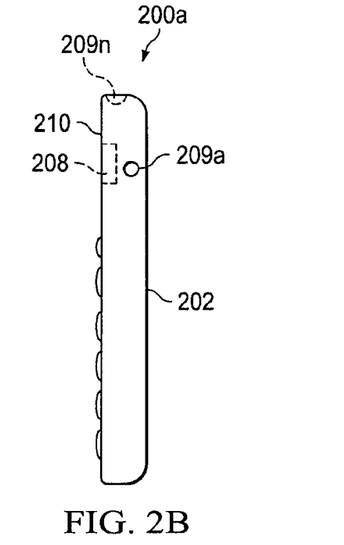

With regard to FIG. 2B, the emergency message button 208 is shown to be recessed within the housing 202 so as to minimize the chance of a user inadvertently pressing the emergency message button 208. In being recessed, the housing 208 may have a protrusion (not shown) around the emergency message button 208 or the emergency message button 208 may be recessed with respect to a surface of the housing 202.

Figure 2C:
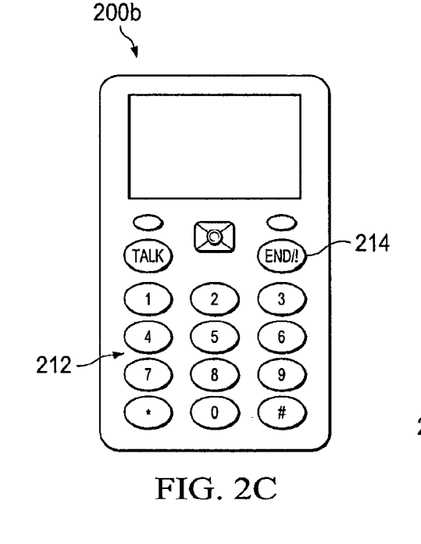

With regard to FIG. 2C, a wireless communications device 200b is shown to be configured with a user interface 212 that includes a multi-purpose button 214 that may be utilized to (i) end a telephone call, (ii) turn on the wireless communications device 200b, (iii) turn off the wireless communications device 200b, and (iv) request an emergency message to be communicated to a PSAP. The wireless communications device 200b may be configured to distinguish between a user's actions of the multi-purpose button 214 so as to avoid communicating an emergency message inadvertently. It should be understood that alternative buttons other than an on/off power button may be utilized.

Figure 2D:
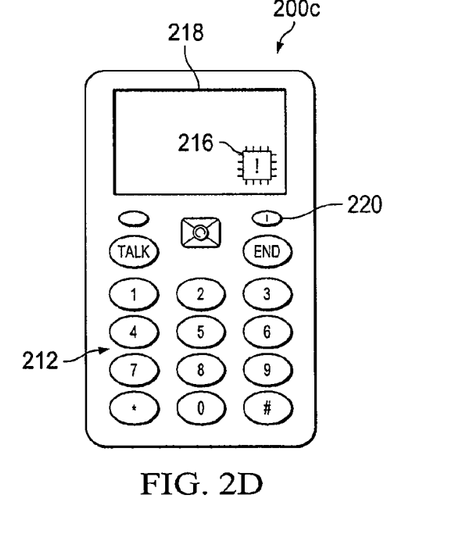

With regard to FIG. 2D, a wireless communications device 200c may be configured to display a soft-button 216 on an electronic display 218 that may be selectable by a user to initiate and communicate an emergency message. If electronic display 218 is a touch screen (i.e., an electronic display that senses a user touching a portion of the electronic display), then the user may activate the soft-button 216 by pressing his or her finger to the electronic display 218 at a region defined by the soft-button 216. Alternatively, the user may select a hard-button 220 associated with the soft-button 216 to initiate an emergency message from the wireless communications device 200c.

Figure 3A:
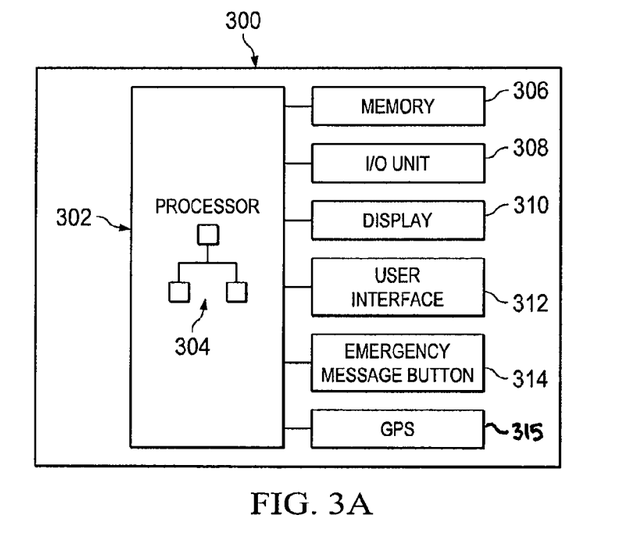
FIG. 3A is a block diagram of an illustrative wireless communications device configured with an emergency message button for generating and communicating an emergency message.

With regard to FIG. 3A, a wireless communications device 300 may include a processing unit 302 that executes software 304. The software may include conventional communications functionality as well as functionality for generating and communicating an emergency message to a public safety answering point. The processing unit 302 may be in communication with a memory 306 that is configured to store data and software, and input/output (I/O) unit 308 that includes wireless communications devices, as understood in the art. The processing unit 302 may further be in communication with an electronic display 310, user interface 312, and emergency message button 314. The electronic display 310 may be configured to display information to a user using the wireless communications device 300. The user interface 312 may enable a user to place telephone calls and/or send text messages via a keypad or otherwise. The emergency message button 314 may be a hard-key that a user may press to initiate an emergency message to be generated and communicated by the software 304. Alternatively, the emergency message button 314 may be a soft-button generated by the processing unit 312 and displayed on the electronic display 310, and enable a user to request an emergency message to be generated and communicated by selection thereof. In one embodiment, the wireless communications device 300 includes GPS circuitry 315, may be utilized to generate geographic coordinates for the processing unit 302 to include in an emergency message, such as an emergency text message, if available.

Figure 3B:
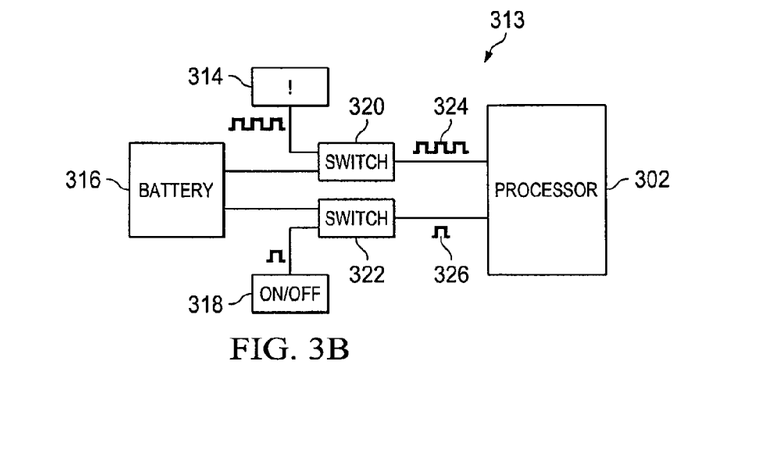
FIG. 3B is a block diagram of an illustrative circuit within the wireless communications device of FIG. 3A for powering-up the wireless communications device using both standard and emergency power-up sequences.

With regard to FIG. 3B, an illustrative circuit 313 is shown to include the emergency message button 314, battery 316, and on/off button 318. Two switches 320 and 322 are configured to switch and generate turn-on signals 324 and 326, respectively, when a user activates the emergency message button 314 or on/off button 318. As shown, the turn-on signal 324 is toggled three times, thereby representing a user selecting the emergency message button 314 three times within a second, which may be a pre-established activation sequence to cause the wireless communications device to activate an emergency power-up sequence. In an alternative embodiment, the emergency message button 314 and on/off button 318 may be the same hard-buttons. In such a configuration, the processing unit 302 may determine whether the user intended to turn on the wireless communications device using a standard power-up sequence or an emergency power-up sequence by determining whether the user activated the on/off button using a pre-established activation sequence.

Figure 4:
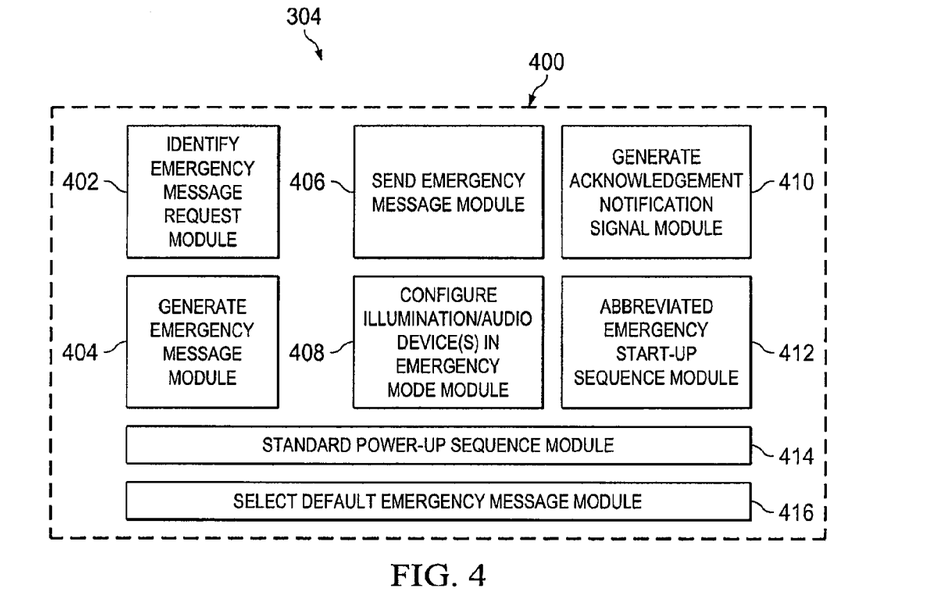
FIG. 4 is a block diagram of illustrative modules that can be executed on the wireless communications device of FIG. 3A.
Figure 5:
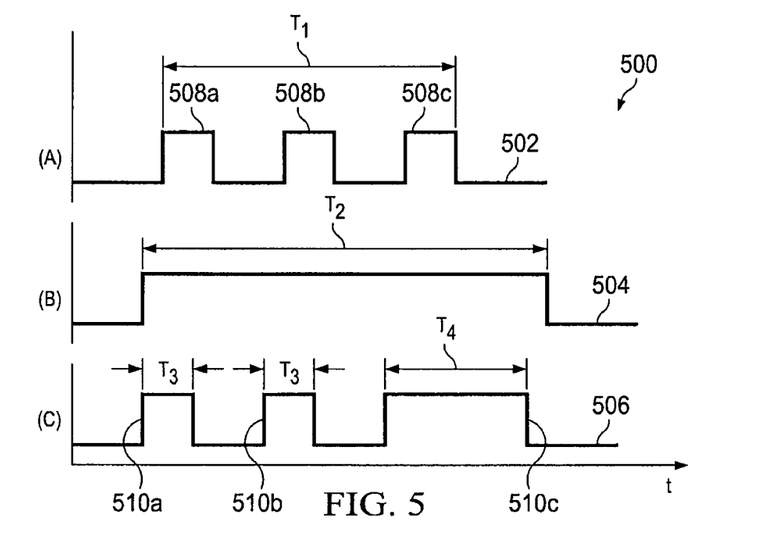
FIGS. 5A-5C are signal diagrams showing illustrative emergency request signals with different activation sequences for initiating an emergency message to be communicated to a public safety answering point.

With regard to FIG. 4, modules 400, which may be software modules of software 304 of FIG. 3A, may be configured to identify a request from a user to generate and communicate an emergency message. Alternatively, one or more of the modules 400 may be hardware modules. An identify emergency message request module 402 may be configured to identify when a user requests an emergency message to be communicated to a public safety answering point. In identifying the emergency message request, the identify emergency message request module 402 may monitor a hard-button or soft-button, depending on the configuration of the wireless communication device in which the modules 400 are being executed. The identify emergency message request module 402 may monitor an emergency message key (e.g., emergency message key 208 of FIG. 2A), to identify a particular sequence that a user presses the emergency message key, as further described with regard to FIG. 5.

A generate emergency message module 404 may be configured to generate (i) a text message for use in sending to a PSAP, (ii) prerecorded voice message, or (iii) speech synthesized voice message. If an emergency text message is generated, the emergency text message may include information about the user and geographical location of the user, including "send to" address, name, home address, telephone number, geographic coordinates (e.g., global positioning system (GPS) coordinates), and other information that can be fit into a text message. If the emergency message is a prerecorded voice message, then the emergency message may be stored in memory of the wireless communications device and played to an operator at a PSAP. The prerecorded voice message may be recorded by the user to provide the PSAP operator with any information that could be helpful to police in the event of an emergency, such as the name of a known stalker. If the emergency message is a speech synthesized message, then the wireless communications device may store data in memory for use in generating an emergency message by a speech synthesizer executed by the wireless communications device that converts the stored data into synthesized speech for audio presentation to an operator at a PSAP. The emergency messages may have information, such as GPS coordinates, added at the time of a call to a PSAP by the wireless communications device in response to the user activating the emergency message button.

A send emergency message module 406 may be configured to send the generated emergency message to a PSAP. If the emergency message is a prerecorded message or a speech synthesized message, then the send emergency message module 406 may automatically call 911 or send a text message to an address (e.g., "emergency.org") for routing to a local PSAP. It should be understood that non-preformatted messages as understood in the art, may be sent by a user to a network address for routing to a PSAP.

A configure illumination/audio device(s) in emergency mode module 408 may be configured to set at least one component into an emergency mode, such as by reducing or eliminating illumination of an electronic display and other illumination devices (e.g., LEDs) of a wireless communications device and significantly lower volume of the wireless communications device (e.g., reduce by 60 dB) of audio device(s) of the wireless communications device. By reducing or turning off illumination and audio devices (i.e., setting the wireless communications device in an emergency mode), a user who requests an emergency message to be sent to a PSAP may be protected in the event that the user is hiding from an intruder who might otherwise discover the user's presence should the wireless device be illuminated or produce an audible sound. In the event that the user desires to turn sound and illumination device(s) back on, the configure illumination/audio device(s) in emergency mode module 408 may turn on the illumination and audio device(s) on in response to the user selecting a button, such as the user-on button or otherwise.

A generate acknowledgement notification signal module 410 may be configured to notify the user that an emergency message has been sent to a PSAP by generating an acknowledgement indicator or acknowledgement notification signal, such as a visual signal. The acknowledgement indicator may be a low-level light by illuminating an LED to light the emergency message button, for example. In an alternative embodiment, the acknowledgement notification signal may be white text or graphics displayed a black background on an electronic display of the wireless communications device, where the white text or graphics indicates that the emergency message was communicated to the PSAP (e.g., "emergency message sent"). In one embodiment, if a successful receipt is received from the PSAP, in addition to notifying the user that the emergency message was communicated, a receipt acknowledgement notification signal may cause an illumination device, such as an LED or electronic display, to change colors, flash a different number of times than the acknowledgement notification signal, or any other indicator to notify the user that the PSAP received the message and help is being sent.

An abbreviated emergency startup sequence module 412 may be configured to start-up or turn on the wireless communications device in an abbreviated manner if an emergency message is requested to be sent while the wireless communications device is turned off. The wireless communications device may execute the abbreviated emergency start-up sequence module 412 to turn on a limited number of components, such as a processing unit, I/O unit, memory, wireless transmission devices, and other devices without turning on an electronic display or other illumination devices to limit the amount of power consumed by the wireless communications device and to quickly generate and communicate an emergency message. In addition, the abbreviated emergency start-up sequence module 412 may automatically cause an emergency message, such as a text message, to be generated and communicated to a PSAP. Furthermore, once the emergency message is communicated to the PSAP, the abbreviated emergency start-up sequence module 412 may illuminate an illumination device, such as an LED, to notify the user that the emergency message was sent.

A standard power-up sequence module 414 may be configured to power-up the wireless communications device in a standard or normal manner. The standard power-up sequence module 414 performs a routine power-up, including turning-on the electronic display.

A select default emergency message module 416 may be configured to enable a user to select a default emergency message via a menu system or other graphical user interface elements. The user may select from multiple different forms of emergency messages, including text messaging, speech synthesis, recorded audio message, email, and instant message. Each of the types of messages may have a different address associated therewith as different forms of communications (e.g., voice, text message, email) are communicated to different network addresses for distribution to a local PSAP. In one embodiment, the user is able to edit a pre-established emergency message to include information associated with the user, such as home address, alternative telephone number, or other information personal to the user.

With regard to FIGS. 5A-5C, three illustrative user request signals 502, 504, and 506, respectively, are displayed. The user request signal 502 includes three pulses 508a-508c (collectively 508) that occur within a time period $T_1$. In one embodiment, the wireless communication device may be configured to identify that an emergency request is made if a user selects an emergency message button three times to produce the three pulses 508 within a given time period, such as one second. By using a sequence, such as three presses of a button within a second, false emergency message requests may be minimized to avoid emergency messages being sent when a user has the wireless communication device in his or her pocket, handbag, or otherwise. As shown in FIG. 5B, an emergency request signal 504 is shown to be activated for $T_2$ seconds. In one embodiment, the wireless communications device may use a pre-established or predetermined sequence for a user to press an emergency message button for two seconds or longer for an emergency request to be generated and sent to a PSAP. In yet another embodiment, as shown in FIG. 5C, the emergency message signal 506 is shown to include three pulses 510a-510c, where the first two pulses have the same duration of $T_3$ and the last pulse 510c has a duration of $T_4$ (i.e., short-short-long). Having a predetermined sequence that is irregular may further minimize inadvertent emergency message requests.

Figure 6:
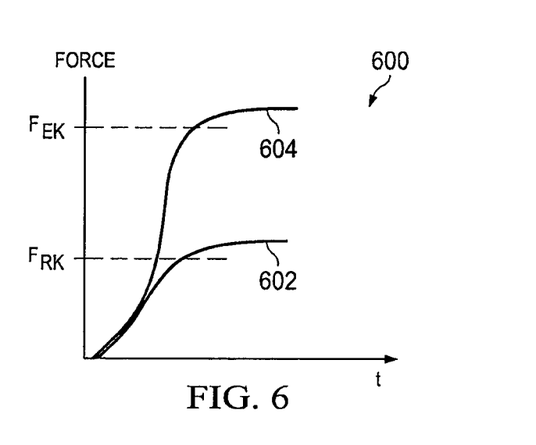
FIG. 6 is a graph of illustrative force signals associated with regular keys and an emergency key for use in initiating an emergency message.

With regard to FIG. 6, two force signals 602 and 604 are shown, where force signal 602 represents an amount of force that a regular key of a user interface requires to activate the regular key (e.g., alphanumeric key) and force signal 604 represents the amount of force required for a user to activate an emergency key. In one embodiment, an emergency key threshold force ($F_{EK}$) is at least two times the amount of regular key threshold force ($F_{RK}$). By using an emergency key that requires a user to apply more force than a regular key to reach a threshold force to activate the emergency key, the user is less likely to inadvertently request an emergency message to be communicated to a PSAP and activate the emergency message key by an intentional act. It should be understood that alternative embodiments may have an emergency key that requires the same or less force than a regular key for activation.

Figure 7:
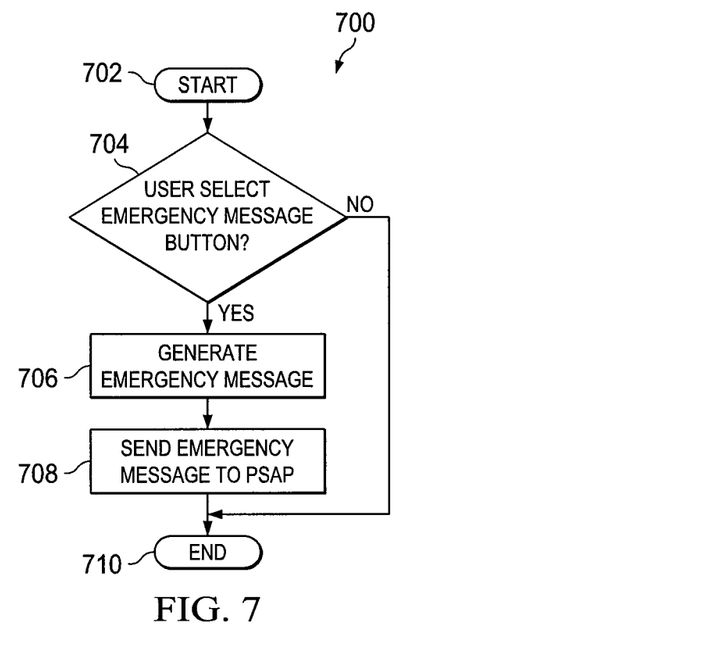
FIG. 7 is a flow diagram of an illustrative process for identifying a user request to generate and send an emergency message.

With regard to FIG. 7, an illustrative process 700 for generating and communicating an emergency message to a PSAP is provided. The process 700 starts with step 702. At step 704, a determination as to whether a user has selected an emergency message button is performed. If the user has selected an emergency message button, then at step 706, an emergency message is generated. The emergency message may be a pre-established text message, audio message, or speech synthesized message. Each of the emergency messages may contain the telephone number of the wireless communications device, home address, current GPS coordinates, and/or other information associated with the user. At step 708, the emergency message may be sent or otherwise communicated to the PSAP. In sending the emergency message to the PSAP, the wireless communications device may communicate the emergency message using a wireless communications protocol for a particular type of message, as understood in the art. For example, if the emergency message is a text message, then the wireless communications device may use SMS. If, alternatively, the message is a prerecorded voice message, then the wireless communications device may communicate over a voice communications channel, as understood in the art. The process ends at step 710. If, at step 704, a determination is made that the user has not selected an emergency message button, then the process ends at step 710.

Figure 8:
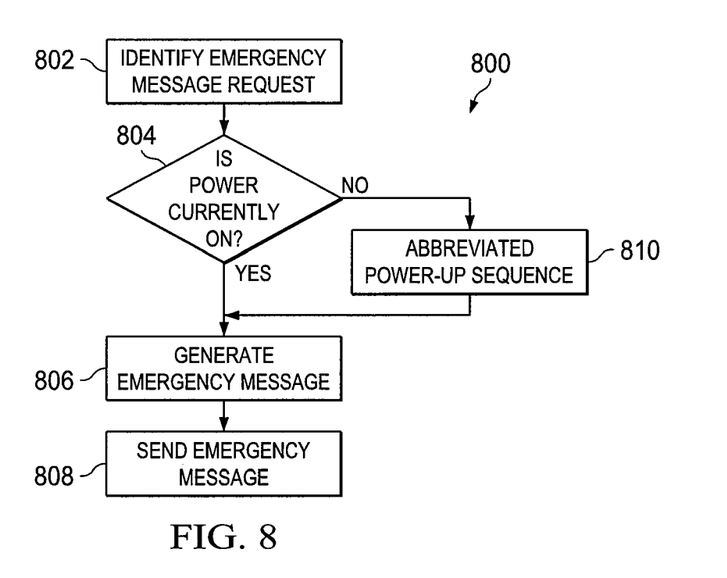
FIG. 8 is a flow diagram of an illustrative process for identifying a user request to generate and communicate an emergency message to a public safety answering point.

With regard to FIG. 8, a process 800 may be used to respond to a user request for generating and communicating an emergency message in both power-on and power-off states of a wireless communications device. The process 800 starts at step 802, where an emergency message request is identified. In identifying an emergency message request, a determination is made as to whether an emergency message button has been selected a pre-determined sequence (e.g., three selections within one second). In identifying that the emergency message request has been made, at step 804, a determination as to whether power of the wireless communications device is currently on may be made by hardware, software, or firmware. If so, then at step 806, an emergency message is generated and sent at step 808. Alternatively, if the power of the wireless communication device is not currently on, then an abbreviated power-up sequence may be performed at step 810 prior to generating and sending an emergency message at steps 806 and 808, respectively. The abbreviated power-up sequence may limit electronic devices within the wireless communications device to turn on so as to accelerate generation and communication of the emergency message. If the communications device is configured to send an emergency message in response to activation of an emergency message button, then the wireless communications device may be configured to turn off with sufficient battery life, such as five percent, to send at least one emergency message or be configured with an emergency battery to be maintained in the event that an emergency message is requested to be sent after battery life of a primary battery has been exhausted.

Figure 9:
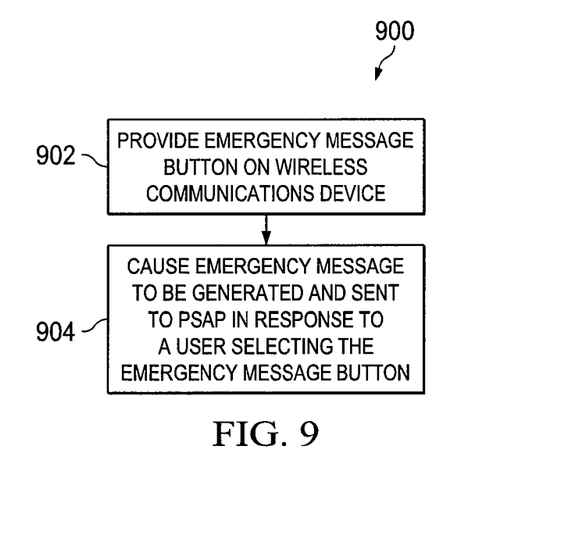
FIG. 9 is a flow diagram of an illustrative process for a wireless communications device in performing a power-up sequence based on the type of power-up sequence requested by a user.

With regard to FIG. 9, an illustrative process 900 provides for a wireless communications device with an emergency message button. At step 902, an emergency message button is provided on a wireless communications device. The emergency message button may be a hard-button or a soft-button. At step 904, an emergency message is caused to be generated and sent to a PSAP in response to a user selecting the emergency message button. In sending the message to a PSAP, if the emergency message is an emergency text message, the emergency text message may be communicated to a central site (e.g., "emergency.gov") to route the emergency text message to a local PSAP. If the emergency message is a prerecorded or speech synthesized message, a call to "911" may be placed in response to the emergency message button being activated by a user automatically (i.e., single button call).

Figure 10:
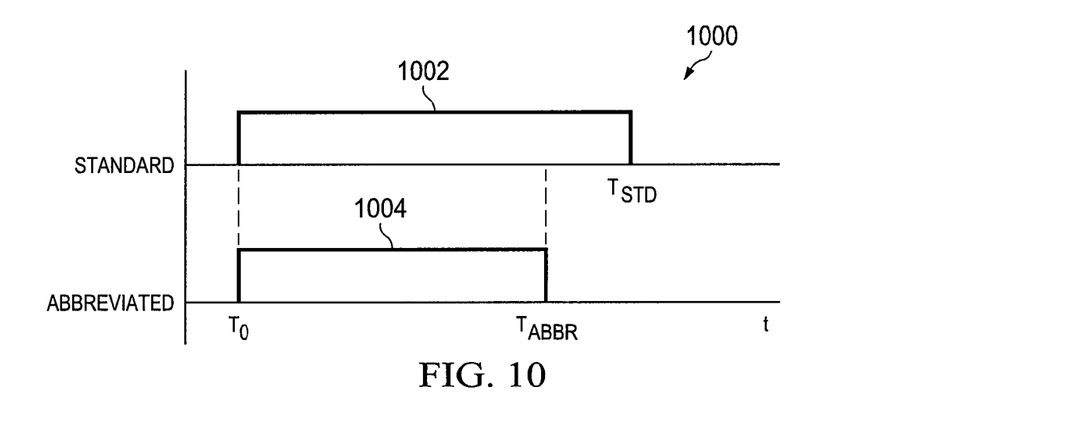
FIG. 10 is a timing diagram of illustrative timings for both standard and abbreviated power-up sequences.

With regard to FIG. 10, a timing diagram shows illustrative graphs 1000 with timing signals 1002 and 1004, which represent standard and abbreviated emergency power-up sequence timing signals, respectively, for powering-up a wireless communications device. As shown, the standard power-up sequence timing signal 1002 lasts for a time $T_{STD}$ and abbreviated power-up sequence timing signal 1004 last for a time $T_{ABBR}$, which is shorter than the length of time than it takes to power-up the wireless communications device using the standard power-up sequence. It should be understood that the relative times between the signals 1002 and 1004 are illustrative and that the differential between the power-up times may be higher or lower.

Figure 11:
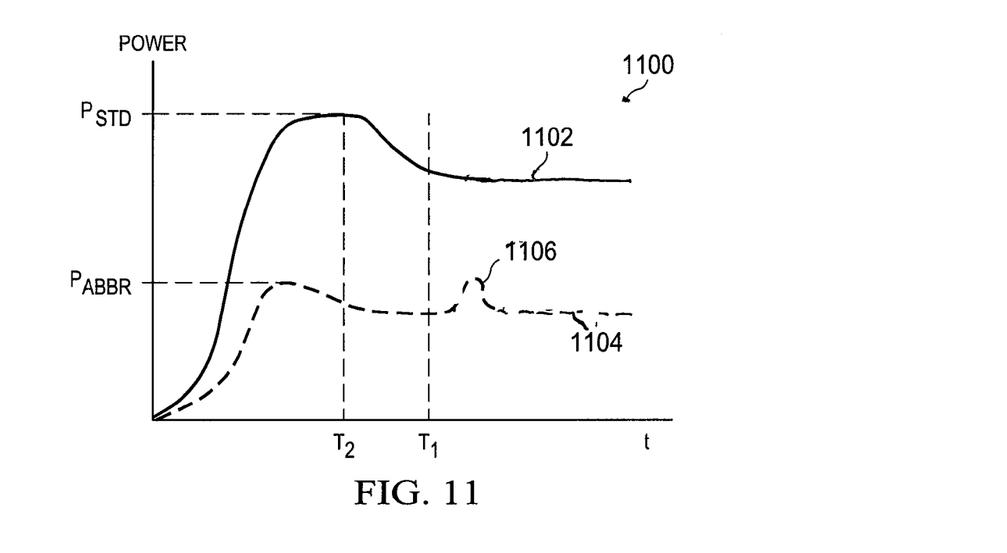
FIG. 11 is a signal diagram of illustrative power usage for both standard and abbreviated power-up sequences.

With regard to FIG. 11, a signal diagram shows an illustrative graph 1100 with power signals 1102 and 1104, which represent standard and abbreviated emergency power-up sequence, respectively, for powering-up a wireless communications device. As shown, the standard power-up power signal 1102 illustrates that the standard power-up sequence uses more power than the abbreviated emergency power-up sequence. Maximum power of the standard power-up sequence is $P_{STD}$, and maximum power of the abbreviated power-up sequence is $P_{ABBR}$, which is lower than the maximum power of the standard power-up sequence. At time $T_1$, the standard power-up sequence is complete and the wireless communications device is powered in a power-on state. At time $T_2$, the abbreviated emergency power-up sequence is completed, which is shorter in time than the standard power-up sequence. Shown on the abbreviated power-up signal 1104 is a power surge 1106 at the time that an emergency message is sent as power is used to drive wireless communications electronics.

Figure 12:
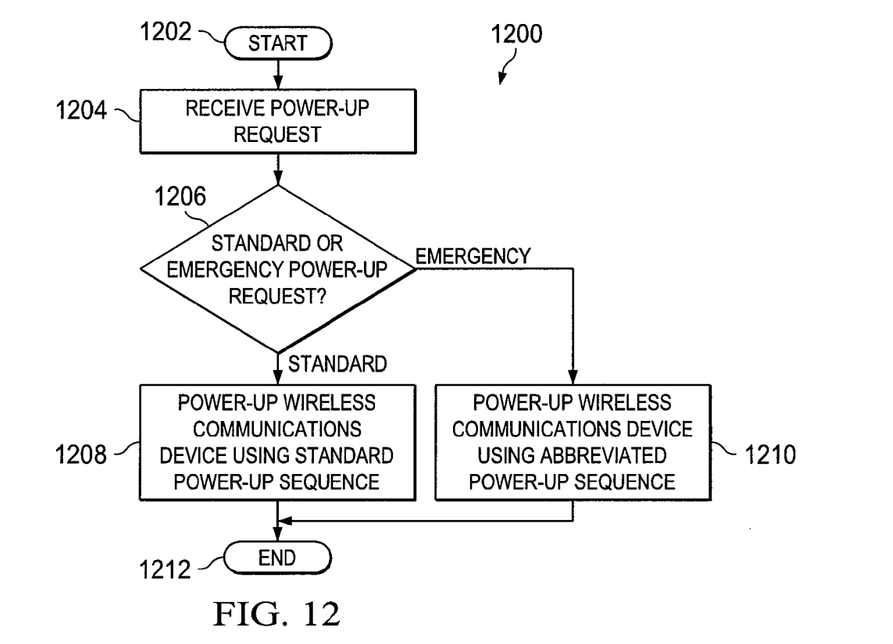
FIG. 12 is a flow diagram of an illustrative process for powering-up a wireless communications device.

With regard to FIG. 12, an illustrative process 1200 may be utilized to power-up a wireless communications device. The process 1200 starts at step 1202. At step 1204, a power-up request is received. At step 1206, a determination may be made as to whether the power-up request is a standard power-up request or an emergency power-up request. The determination may be made based on a signal line over which the power-up request is received by a processing unit or a power-up signal that is received. For example, a power-up signal may match a pre-established power-up sequence (e.g., three activations of an emergency message button within one second). If the power-up request is a standard power-up request, then at step 1208, the wireless communications device is powered-up using a standard power-up sequence, where a standard power-up sequence turns on the wireless communications device as currently understood in the art. If the request is determined to be an emergency power-up request at step 1206, then the wireless communications device is powered up using an abbreviated power-up sequence at step 1210. The abbreviated power-up sequence may power up fewer electronics or power-up the wireless communications device faster by not executing all standard power-up sequence software routines. The process ends at step 1212.

Figure 13:
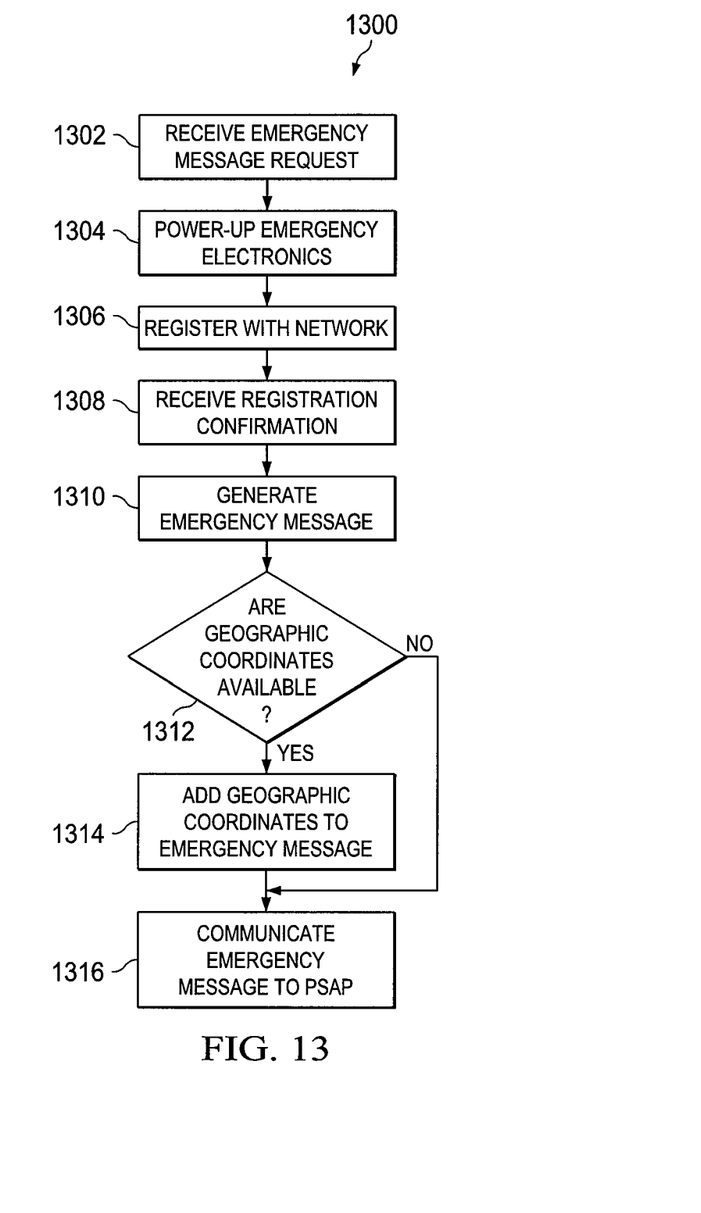
FIG. 13 is a flow diagram of a more detailed illustrative process for powering-up a wireless communications device.

With regard to FIG. 13, a more detailed process 1300 for performing an emergency power-up sequence is provided. The process 1300 starts at step 1302, where an emergency message request is received. At step 1304, emergency electronics are powered-up. In one embodiment, the emergency electronics may exclude powering up unnecessary electronics, such as an audible device or electronic display) that are not utilized for generating and communicating an emergency message so as to conserve power or minimize chance of a person in an emergency being detected. At step 1306, the wireless communications device registers with a communications network and registration confirmation is received at step 1308.

At step 1310, an emergency message is generated. In one embodiment, the emergency message is an emergency text message. Alternatively, the emergency message may be a voice synthesized message. At step 1312, a determination is made as to whether geographic coordinates are available. If so, then at step 1314, geographic coordinates are added to the emergency message. The geographic coordinates may be GPS coordinates if the wireless communications device is configured with a GPS device. Alternatively, the geographic coordinates may be generated by the wireless communications device requesting geographic coordinates from the communications network. If the geographic coordinates are not available at step 1312, then the message is communicated to a PSAP without the geographic coordinates at step 1316.

Figure 14:
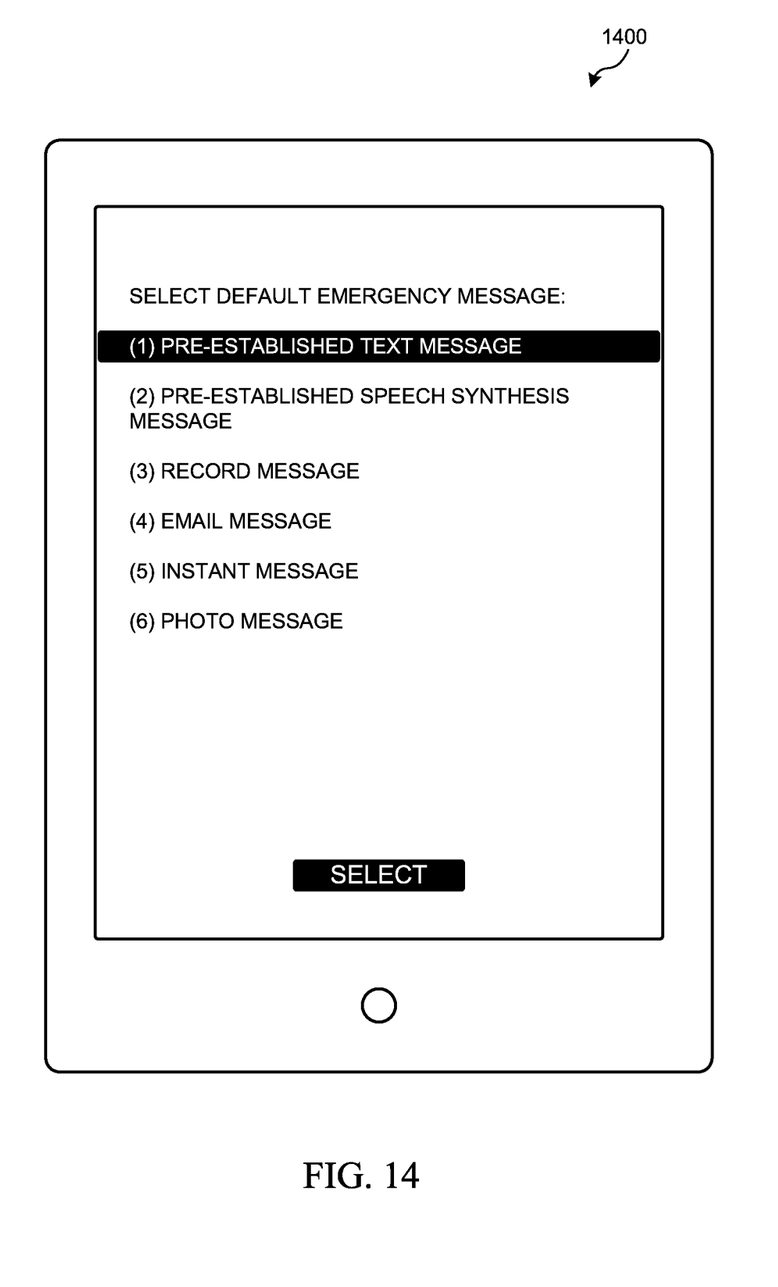
FIG. 14 illustrates an exemplary graphical user interface on a wireless communications device to allow a user to select a default emergency message.

With regard to FIG. 14, an illustrative graphical user interface 1400 displayed on a wireless communications device may be generated by a software module, such as the select default emergency message module 416 (FIG. 4), to enable a user to select one as a default emergency message. A user of the wireless communications device may communicate the default emergency message in response to the user activating an emergency message button, either hard-button or soft-button. As shown, a variety of emergency message types may be available for selection as a default emergency message, including a (1) pre-established emergency text message, (2) pre-established speech synthesis message, (3) record message, (4) email message, (5) instant message, and (6) photo message. Depending on the model of the wireless communications device, not all of the emergency message default options shown may be available. For example, if the wireless communications device does not have speech synthesis capabilities, then the (2) pre-established speech synthesis message option may not be available. In addition, if the wireless communications device does not have email capabilities, then the (4) email message option would not be available.

The user may select the option most appropriate for him or her depending on the area in which he or she lives. If the user lives in a rural area, then it is unlikely that any local PSAPs are configured to receive emergency data messages, such as text messages, email messages, instant messages, or image messages, so the user should select either the pre-established speech synthesis message, if the wireless communications device is configured with a speech synthesizer or record a message. If a text-to-speech synthesizer is available on a network, such as the PSTN, then it may be desirable for the user to select the (1) pre-established text message option to communicate to a local PSAP.

Each of the available selectable emergency messages has its pros and cons. For example, a text message is good because a text message can be communicated without an operator having to answer a call and it is a short message that can be communicated very quickly. Given that some PSAPs routinely have delays in responses, an emergency message that is performed via a voice channel, such as the (2) pre-established speech synthesis message and (3) voice recorded message, may not be the most efficient for the user if in an emergency that requires an immediate response. The (4) email message may also be good because an email may be communicated quickly. However, depending on the location of the user and the capabilities of local PSAPs, that data message option may be limited in value. The (6) image message is good because a photograph or video of the user may be sent to the PSAP for distribution to emergency personnel, thereby shortening response time. However, sending a photo or video is not as fast as a text message and local PSAPs would need to be configured to handle such data. Users may consult their service provider or PSAP to determine communications capabilities.

Figure 15:
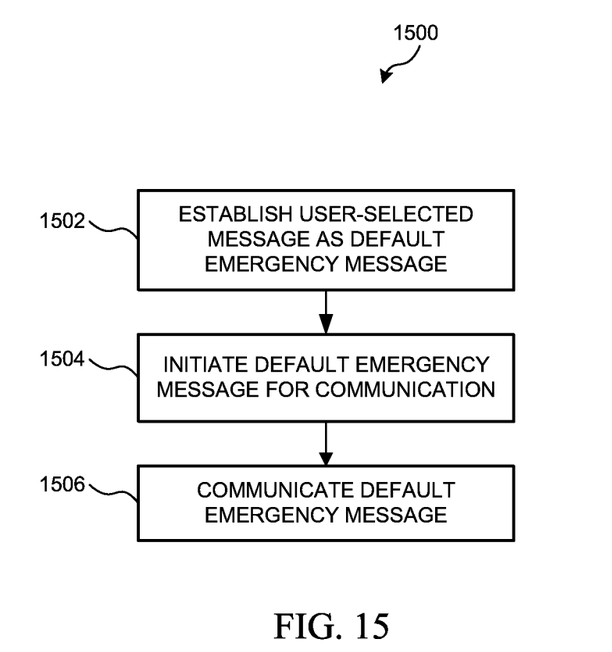
FIG. 15 is a flow diagram of an illustrative process for allowing a user of a wireless communications device to select a default emergency message and/or communicate the emergency message.

With regard to FIG. 15, a illustrative process 1500 may be utilized to enable a user of a wireless communications device to select a default emergency message and communicate the default emergency message. At step 1502, a user-selected emergency message from among multiple available emergency messages may be established as a default emergency message. Each of the multiple emergency messages may be of a different type (e.g., text, recorded speech, email). At step 1504, the default emergency message may be initiated for communication. In one embodiment, the default emergency message is initiated in response to a user selecting an emergency message button. In initiating the default emergency message, the default emergency message may be populated with user-related information that may be stored in the wireless communications device. The user-related information may include the user's home address, alternative telephone number, and so on. In addition, if geographic coordinates, such as GPS coordinates, are available when the emergency message is initiated, then the geographic coordinates may be included in the emergency message. If, for example, the emergency message is a text or email message, then the geographic coordinates may be inserted therein. If the emergency message is a voice synthesized message, then the geographic coordinates may be spoken by a voice synthesizer while communicating with an operator at a PSAP.

At step 1506, the default emergency message is communicated over a wireless communications network for routing to a PSAP. In communicating the emergency message, depending on the type of emergency message that is communicated, a different network address may be used to communicate the emergency message to the PSAP. For example, if the emergency message is a text message, then the network address may be an Internet Protocol domain name, such as "911.911," which is associated with a server for routing to a local PSAP that has the communications capabilities to receive the emergency message. Alternatively, if the emergency message is a recorded speech message or speech synthesized message, then the network address may be "911," as is conventionally utilized by callers.

Although the emergency message button has been described for use on a wireless communications device, it should be understood that the principles of the present invention could be applied to other wireless devices, such a voice over Internet protocol (VoIP) telephones, portable game consoles (e.g., Nintendo DS), or fixed game consoles, such as x-box, where network connectivity exists. Still yet, the principles of the present invention could be applied to wired communications devices, such as telephones. Furthermore, the term button is representative of any device, such as a switch, knob, wheel, or otherwise, that can be utilized to interact with the wireless communications device.

Although the principles of the present invention have primarily been described with regard to wireless communications devices, it should be understood that wired communications devices, including wired/wireless computers, may be adapted to include emergency messaging, as described herein. One or more buttons or other initiation devices may be provided on the wired communications devices to generate and communicate an emergency data message to a network location for routing to a PSAP local to the user. In adapting the wired communications devices, software may be included in the devices to generate and communicate an emergency data message (e.g., text message or email) using a communications protocol that is capable of being communicated over the communications network (e.g., public switched telephone network, cable network, Internet), as understood in the art. Information specific to the user, location of the user, or otherwise may be included in the emergency data message. For example, name, address, number of people in residence, photograph, medical conditions, or any other information may be pre-established for retrieval and inclusion in the emergency data message, thereby providing information to an operator at a PSAP to provide emergency personnel, such as police, firemen, or medical personnel.

The previous detailed description is of a small number of embodiments for implementing the invention and is not intended to be limiting in scope. One of skills in this art will immediately envisage the methods and variations used to implement this invention in other areas than those described in detail. The following claims set forth a number of the embodiments of the invention disclosed with greater particularity.

The invention claimed is:

1. A wireless communications device, comprising:
   electronics components;
   a power-on button;
   an emergency message button;
   a standard power-up sequence module that, in response to a user activating a power-on button while the wireless communications device is in a power-off mode, causes the wireless communications device to perform a standard power-up sequence to turn on said electronics components; and
   an abbreviated power-up sequence module that, in response to the user activating an emergency message button while the wireless communications device is in a power-off mode, causes the wireless communications device to perform an abbreviated power-up sequence to turn on at least a portion of said electronics components while not turning on a display screen of the wireless communications device; and
   one or more emergency message modules that, as part of the abbreviated power-sequence, provide to the user a list of a plurality of selectable emergency messages for a user to select an emergency message from among multiple forms of messages, the multiple forms of messages comprising one or more text messages, one or more recorded voice messages, and one or more email messages, receive an emergency message selection from the user of one of the plurality of selectable emergency messages, generate the selected emergency message to be transmitted to a public safety answering point ("PSAP"), communicate the emergency message to the PSAP, receive a confirmation receipt from the PSAP that the emergency message was received by the PSAP; and, in response to receiving the confirmation, provide a visual indicator indicating to the user that the emergency message has been received by the PSAP, the visual indicator comprising illumination of an illumination device other than the display screen.

2. The wireless communications device according to claim 1, wherein said abbreviated power-up sequence module turns on electronic components of the wireless communications device faster than said standard power-up sequence module.

3. The wireless communications device according to claim 1, wherein said abbreviated power-up sequence module turns on fewer electronic components of the wireless communications device than said standard power-up sequence module.

4. The wireless communications device according to claim 1, wherein said abbreviated power-up sequence module causes the wireless communications device to communicate with a communications network faster than said standard power-up sequence module.

5. The wireless communications device according to claim 1, wherein said emergency message button is a hard-button independent of a power-on button.

6. The wireless communications device according to claim 1, wherein said emergency message button is a hard-button that shares a hard-button with another function.

7. The wireless communications device according to claim 6, wherein said emergency message button shares a hard-button with a power-on function.

8. The wireless communications device according to claim 1, further comprising an identify emergency message request module that identifies when the user activates said emergency message using a pre-determined sequence.

9. A method for powering-up a wireless communications device, the wireless device comprising a standard power-up sequence module, which causes the wireless communication device to perform a standard power-up sequence to turn on electronic components in the wireless device in respect to a user activating a power-on button and an abbreviated power-up sequence module that causes the wireless communications device to perform an abbreviated power-up sequence to turn on a portion of said electronics in response to a user activating an emergency message button, said method comprising:

powering-up the wireless communications device using the abbreviated power-up sequence in response to the user activating the emergency message button, while not turning on a display screen of the wireless communications device;

providing to the user a list of a plurality of selectable emergency messages for a user to select an emergency message from among multiple forms of messages, the multiple forms of messages comprising one or more text messages, one or more recorded voice messages, and one or more email messages receiving an emergency message selection from the user of one of the plurality of selectable emergency messages;

generating the selected emergency message to be transmitted to a public safety answering point ("PSAP") in response to the user activating the emergency message button;

communicating the emergency message to the PSAP in response to the user activating the emergency message button; and receiving a confirmation receipt from the PSAP that the emergency message was received by the PSAP;

in response to receiving the confirmation, providing a visual indicator indicating to the user that the emergency message has been received by the PSAP, the visual indicator comprising illumination of an illumination device other than the display screen.

10. The method according to claim 9, wherein powering-up the wireless communications device using the abbreviated power-up sequence powers up the wireless communications device faster than using the standard power-up sequence.

11. The method according to claim 9, wherein powering-up the wireless communications device using the abbreviated power-up sequence powers up fewer electronics in the wireless communications device than using the standard power-up sequence.

12. The method according to claim 9, wherein powering-up the wireless communications device using the abbreviated power-up sequence causes the wireless communications device to communicate with a communications network faster than using the standard power-up sequence.

13. The method according to claim 9, wherein the emergency message button is a hard-button.

14. The method according to claim 13, further comprising determining that the user activated the hard-button using a pre-determined sequence.

15. The method according to claim 14, wherein determining that the user activated the hard-button using a pre-determined sequence three times within one second.

16. The method of claim 9, wherein the emergency message button comprises the illumination device.

* * * * *